UNITED STATES PATENT OFFICE.

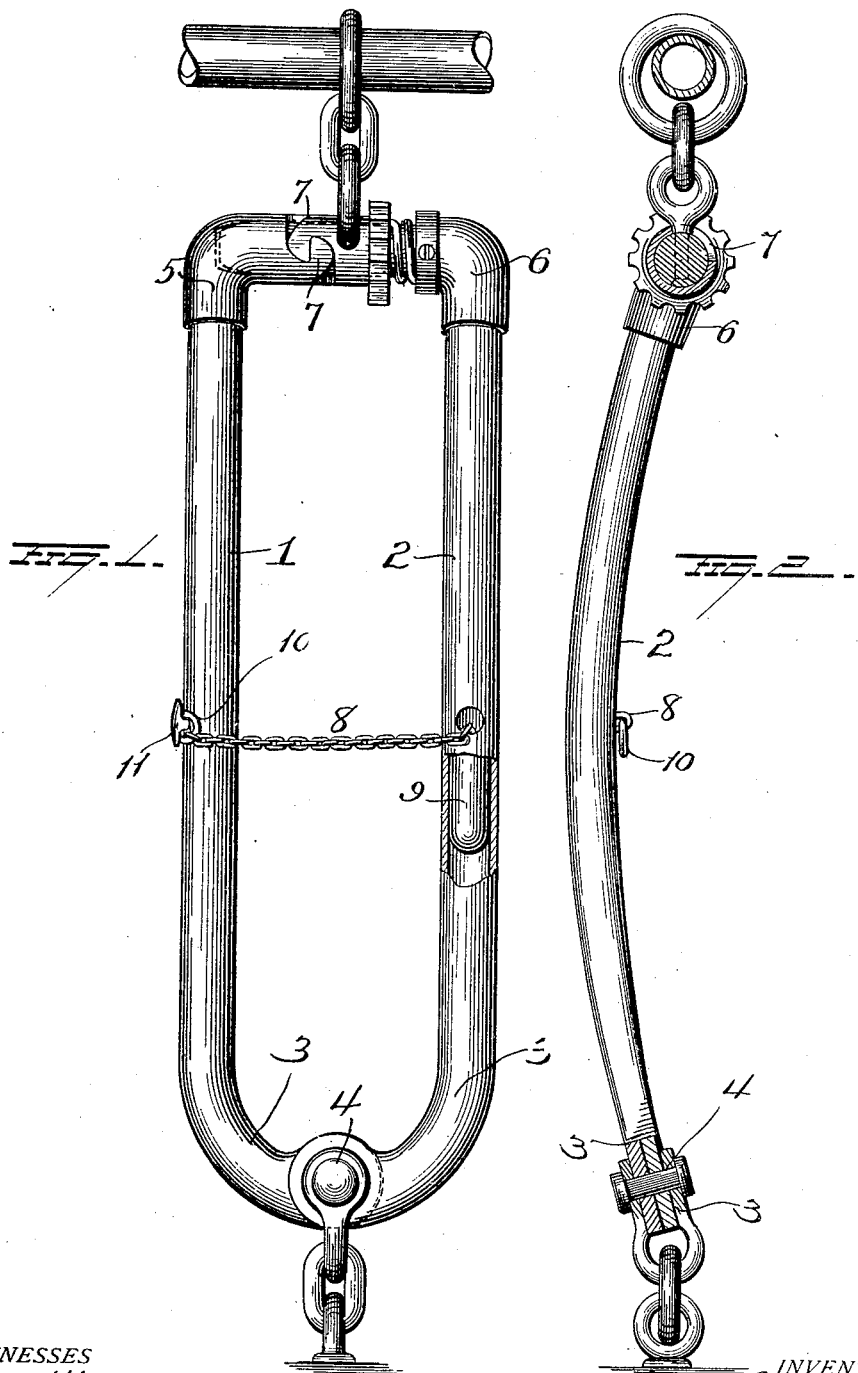

SAMUEL M. SHOEMAKER, OF ECCLESTON, MARYLAND, ASSIGNOR TO HIMSELF AND CHARLES S. BUCKINGHAM, OF ECCLESTON, MARYLAND.

STANCHION.

1,119,649.      Specification of Letters Patent.      Patented Dec. 1, 1914.

Application filed December 15, 1913. Serial No. 806,866.

*To all whom it may concern:*

Be it known that I, SAMUEL M. SHOEMAKER, of Eccleston, in the county of Baltimore and State of Maryland, have invented certain new and useful Improvements in Stanchions; and I do hereby declare the following to be a full, clear, and exact description of the invention, such as will enable others skilled in the art to which it appertains to make and use the same.

This invention relates to an improvement in cattle stanchions, and more particularly to that type in which the stanchion is loosely supported at its respective ends,—the object of the invention being to so construct the stanchion that the animal will be permitted adequate freedom of movement and at the same time be prevented from standing sufficiently far forward in the stall to allow the droppings to escape the stall gutter.

With this and other objects in view, the invention consists in certain novel features of construction and combinations of parts as hereinafter set forth and pointed out in the claims.

In the accompanying drawings; Figure 1 is a front elevation of the stanchion, and Fig. 2 is a sectional view showing one of the upright members in elevation.

1—2 represent two bars or upright members provided at their lower ends with inwardly curved arms 3 having flattened overlapping portions pivotally connected or hinged together, as at 4. Elbows 5 and 6 are secured to the upper ends of the respective bars or upright members and these elbows are provided with coöperating locking devices 7 for uniting the upper ends of the stanchion members. The upright bars 1—2 of the stanchion are curved or bowed rearwardly, as shown in Fig. 2 for the double purpose of preventing the animal advancing far enough forwardly to cause droppings to fall upon the floor of the stall instead of into the gutter provided therefor; and also for the purpose of allowing the animal greater comfort when lying down, in that the gradual curvature of the uprights prevents the stanchion from bearing hard against the animal's ears, as is the case with the ordinary stanchion having straight uprights.

In order to keep the animal on her feet, as for instance, after she has been prepared for milking,—a chain 8 is provided and extends across the breast of the animal. When the chain is not in use it may be housed within the tubular bar or upright 2 and will be retained or withdrawn thereinto by means of a weight 9 within the bar. When it is desired to employ the chain as above described, the same will be withdrawn from the bar 2 and extended across the breast of the animal, and the free end of the chain will be attached (by means of a ring 10) to a keeper 11 on the bar or upright member 1 of the stanchion.

Having fully described my invention what I claim as new and desire to secure by Letters-Patent, is:—

1. A stanchion comprising two normally parallel members hinged together at their lower ends, said members being bowed rearwardly so as to be curved gradually from their upper to their lower ends, and locking means for connecting the upper ends of said members.

2. A stanchion comprising two upright tubular members hinged together at their lower ends and curved rearwardly from end to end, locking means for the upper ends of the tubular upright members, a chain removably connected with one of said curved upright members and housed within the other curved member when not in use, and a weight on said chain within the last-mentioned curved member.

In testimony whereof, I have signed this specification in the presence of two subscribing witnesses.

SAMUEL M. SHOEMAKER.

Witnesses:
I. M. JOHNSTON,
W. W. CROSBY.

Copies of this patent may be obtained for five cents each, by addressing the "Commissioner of Patents, Washington, D. C."